United States Patent [19]
Murphy

[11] 3,879,768
[45] Apr. 29, 1975

[54] APPARATUS FOR HUMIDIFYING AND PURIFYING AIR

[76] Inventor: Joseph I. Murphy, 1409 Line Oak St., New Smyrna Beach, Fla. 32069

[22] Filed: Apr. 5, 1974

[21] Appl. No.: 458,093

[52] U.S. Cl. ............................................. 4/1; 4/18
[51] Int. Cl. .......................................... A47k 17/00
[58] Field of Search ............ 4/1, 18, 12, 23; 55/236, 55/223; 261/151

[56] References Cited
UNITED STATES PATENTS

| | | | |
|---|---|---|---|
| 1,383,886 | 7/1921 | Webb, Sr. .................................. 4/1 |
| 2,238,146 | 4/1941 | Yavitch .............................. 4/18 UX |
| 2,738,851 | 3/1956 | Warch .................................. 4/18 X |
| 2,908,018 | 10/1959 | Petrie .................................... 4/41 X |
| 3,107,747 | 10/1963 | Parkison .............................. 4/18 X |

*Primary Examiner*—Henry K. Artis
*Attorney, Agent, or Firm*—Duckworth, Hobby & Allen

[57] ABSTRACT

Air humidifying and purifying apparatus comprises a fluid reservoir with an open ended, upstanding tube extending upward out of the reservoir. The apparatus includes means for raising the fluid in the reservoir to the upper extremity of the tube, and additional means at the upper extremity for breaking the fluid passing therethrough into rivulets.

8 Claims, 2 Drawing Figures

APPARATUS FOR HUMIDIFYING AND PURIFYING AIR

BACKGROUND OF THE INVENTION

1. Field of the Invention

The present invention relates to air humidifying and purifying apparatus, and in particular, relates to apparatus employing means for forming a fluid mist.

2. Description of the Prior Art

There are a variety of air humidifying devices presently available on the market today. One type of device includes some means, such as a centrifugal fan, for breaking up water into a fine mist, after which the mist is dispersed. Another humidifying arrangement employs means for passing an electric current through water to generate steam.

Other devices are also available which purify air by employing a falling water spray to which dust and other air impurities become attached. See, for example, the following U.S. Pat. Nos.: 3,763,634; 3,751,882; 3,742,682; 3,628,311; 3,754,741; and 1,699,424.

While these arrangements are suitable under certain circumstances, there is a need for means which provides both functions, i.e., both humidification and purification. It would also be desirable to provide means for easily removing the collected air impurities, as by providing means communicating with the sewage system for example. Apparatus of this nature would be especially useful in industrial facilities where harmful impurities are imparted in the air by manufacturing activities, such as in factories where asbestos and fiberglass products are made.

SUMMARY OF THE INVENTION

The present invention contemplates apparatus comprising a fluid reservoir with an open ended upstanding tube extending upward out of the reservoir. Means are provided for raising the fluid in the reservoir to the upper extremity of the tube, and other means at the upper extremity break the fluid passing therethrough into rivulets.

THE DRAWING

DETAILED DESCRIPTION

Figure 1:
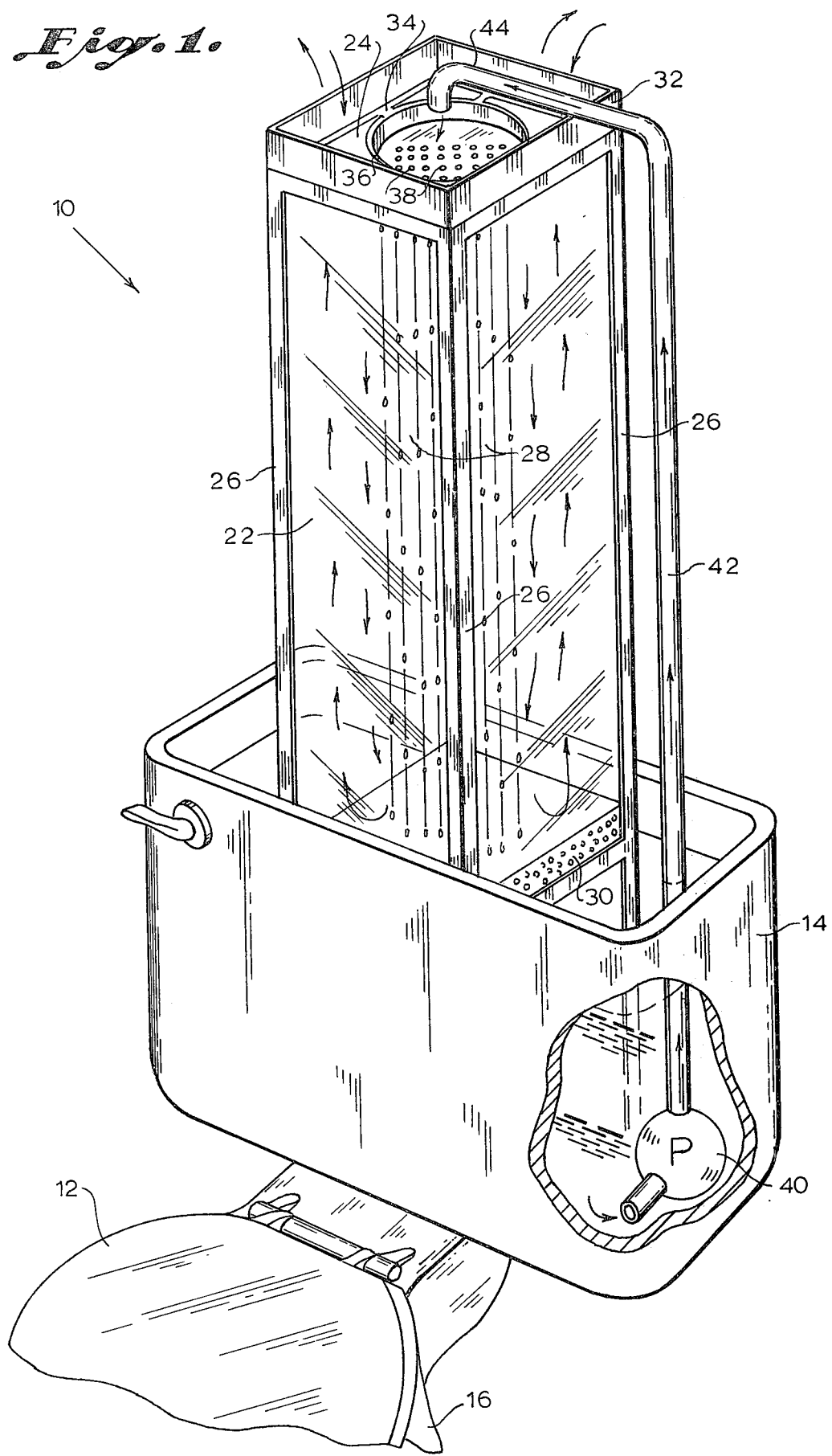
FIG. 1 is a perspective front view partially cut away, of one embodiment of the apparatus in accordance with the present invention.
Figure 2:
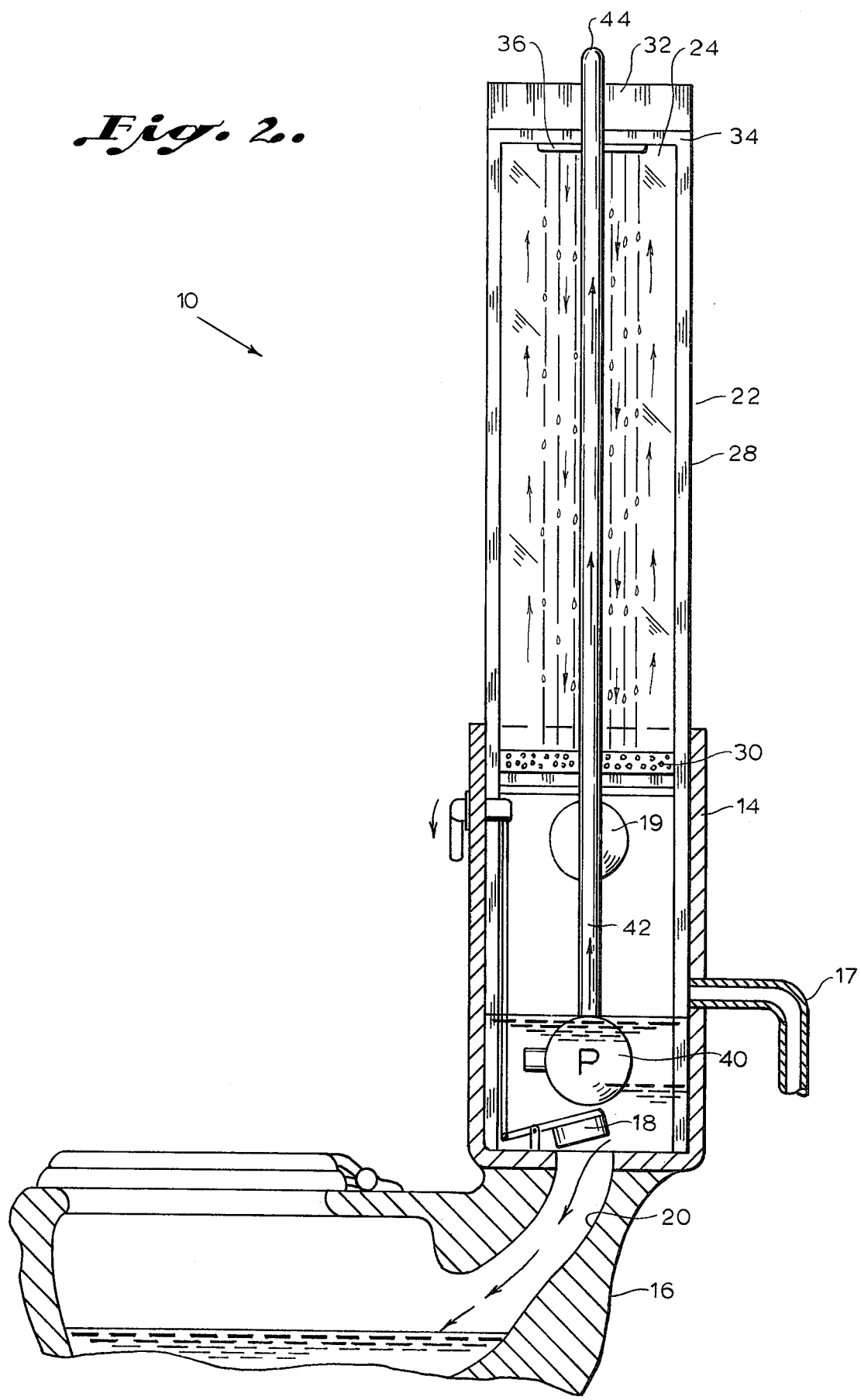
FIG. 2 is a side view, in cross section, of the embodiment illustrated in FIG. 1.

An embodiment of apparatus in accordance with the present invention is shown in FIGS. 1 and 2 and described with reference thereto.

The apparatus, referred to generally as 10, comprises a toilet 12 having a reservoir or tank 14 and a toilet bowl 16 with a communicating opening 20 therebetween. A valve 18 in the tank 14 is positioned in the opening 20 controls the flow of water and draining from the tank to the bowl 16. A ball float 19 controls the fluid level in the tank 14 (FIG. 2). A pipe 17 serves to refill the tank 14. As described thus far, the apparatus 10 comprises a well known toilet arrangement which communicates with a sewage or septic disposal system in a well known manner.

In accordance with the present invention, there is provided an open-ended tube 22 extending upright from the tank 14 and having an upper, open extremity 24. The tube 22 may be formed of a framework 26 which supports glass or clear plastic 28 to provide walls of the tube having a clearance for the ball float 19. A sound deadening material 30 may be positioned along a lower portion of the tube 22. A removable member 32 is positioned in the upper open extremity 24 of the tube 22, and includes a frame 34 supporting a plate 36. The plate 36 is of substantially smaller dimension than the open extremity 24, and includes apertures 38 therein.

The apparatus 10 further includes a pump 40 positioned at the bottom of the tank 14, a pipe 42 communicating with the pump and having a horizontal extension 44 extending over the plate 36. The extension 44 over the plate 36 should release water close enough to the plate so that it will not splash outside of top of the tube 22.

In use, the pump is operated in a fashion so as to provide flow of water from the horizontal extremity 44 and through the apertures 38 of the plate 36. This water thus forms tiny rivulets, that is, small droplets. At the same time, air moves through the space between the plate 36 and the member 32 creating turbulence in the tube 22. As a result, humid air is forced out of the tube 22 and into the surrounding environment. In this way, the apparatus 10 serves to raise the humidity level of the air in a closed room or similar area.

Simultaneously, as the air moves around in the tube 22, any impurities and other particles, such as dust for example, are removed from the air by the downward movement of the water droplets. The air exiting the tube 22 is thus more humid and cleaner than the air entering that tube. Impurities and particles removed from the air pass into the tank 14, and when the water in the tank 14 is subsequently used via the opening 20 for purposes or removing waste from the toilet bowl 16, the impurities are likewise removed with the waste to the local sanitation system.

Other modifications and arrangements will be clear to those skilled in this art from the above description and the drawings.

I claim:

1. Air humidifying and purifying apparatus for use with a toilet comprising:
   a toilet having a tank comprising a fluid reservoir;
   means for draining said tank;
   means for refilling said tank;
   an open-ended, upstanding tube extending out of said reservoir;
   means for raising fluid in said reservoir to the upper extremity of said tube; and
   means at the upper extremity for breaking fluid passing therethrough into rivulets.

2. The apparatus recited in claim 1 further comprising sound deadening means interposed in the path of said rivulets at a lower portion of said tube.

3. The apparatus recited in claim 1 wherein said fluid raising means comprises:
   a pump in said tank; and
   a pipe communicating with said pump and the upper extension of said tank.

4. The apparatus recited in claim 3 wherein said rivulet means comprises a plate positioned in the upper extremity of said tube, said plate having a plurality of apertures therein.

5. The apparatus recited in claim 4 wherein said plate has a substantially smaller dimension than said tube.

6. The apparatus recited in claim 5 further comprising means for suspending said plate in the upper extremity of said tube.

7. The apparatus as recited in claim 6 further comprising a member removably mounted in the upper extremity of said tube, wherein said member supports said plate and said suspending means.

8. The apparatus recited in claim 7, wherein said pipe has an opening positioned over said plate.

* * * * *